(12) United States Patent
Tamura

(10) Patent No.: US 12,100,252 B2
(45) Date of Patent: Sep. 24, 2024

(54) PASSAGE PROPRIETY ASSESSMENT DEVICE, PASSAGE MANAGEMENT SYSTEM, PASSAGE PROPRIETY ASSESSMENT METHOD, AND COMPUTER PROGRAM

(71) Applicant: Panasonic Intellectual Property Management Co., Ltd., Osaka (JP)

(72) Inventor: Hajime Tamura, Tokyo (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 391 days.

(21) Appl. No.: 17/622,023

(22) PCT Filed: Apr. 13, 2020

(86) PCT No.: PCT/JP2020/016331
§ 371 (c)(1),
(2) Date: Dec. 22, 2021

(87) PCT Pub. No.: WO2021/002079
PCT Pub. Date: Jan. 7, 2021

(65) Prior Publication Data
US 2022/0245979 A1 Aug. 4, 2022

(30) Foreign Application Priority Data
Jul. 2, 2019 (JP) ................. 2019-123753

(51) Int. Cl.
*G07C 9/00* (2020.01)
*G06V 40/16* (2022.01)
*G06V 40/40* (2022.01)

(52) U.S. Cl.
CPC ....... *G07C 9/00563* (2013.01); *G06V 40/172* (2022.01); *G06V 40/40* (2022.01)

(58) Field of Classification Search
CPC ........ G07C 9/00563; G07C 9/10; G07C 9/37; G07C 9/38; G06V 40/172; G06V 40/40
See application file for complete search history.

(56) References Cited

U.S. PATENT DOCUMENTS

| | | | | |
|---|---|---|---|---|
| 2002/0191817 A1* | 12/2002 | Sato | ..................... | G06V 40/172 382/118 |
| 2010/0045424 A1* | 2/2010 | Kawakita | ................. | G07C 9/37 340/5.2 |

(Continued)

FOREIGN PATENT DOCUMENTS

| | | |
|---|---|---|
| EP | 1251468 | 10/2002 |
| JP | 2010-003009 | 1/2010 |
| JP | 5045128 | 10/2012 |

OTHER PUBLICATIONS

Extended European Search report dated Jul. 21, 2022 issued in European Patent Application No. 20835152.8.

(Continued)

*Primary Examiner* — Edward F Urban
*Assistant Examiner* — Wassim Mahrouka
(74) *Attorney, Agent, or Firm* — GREENBLUM & BERNSTEIN, P.L.C.

(57) ABSTRACT

A passage propriety assessment device, provided with: a assessment unit that authorizes a person to pass through a first entrance/exit when a first facial image of the person at the first entrance/exit satisfies an individual authorization criterion, which is a criterion for assessing by facial recognition that the person is a pass-authorized person; and a setting unit that, when it is assessed that a person who has been authorized to pass through the first entrance/exit is impersonating a pass-authorized person, sets the individual authorization criterion for a pass-authorized person for a second entrance/exit located after the first entrance/exit so as to be higher than the individual authorization criterion for (Continued)

the first entrance/exit. When a second facial image of a person at the second entrance/exit does not satisfy the individual authorization criterion that was set higher, the assessment unit restricts the person from passing through the second entrance/exit.

13 Claims, 9 Drawing Sheets

(56) References Cited

U.S. PATENT DOCUMENTS

| | | | |
|---|---|---|---|
| 2013/0063581 A1* | 3/2013 | Komatsu | G06V 40/50 |
| | | | 348/E7.085 |
| 2016/0269401 A1* | 9/2016 | Saito | G07C 9/20 |
| 2020/0357209 A1* | 11/2020 | Kochi | G07C 9/00563 |
| 2021/0081649 A1* | 3/2021 | Kochi | G06T 7/0014 |

OTHER PUBLICATIONS

International Search Report issued in International Pat. Appl. No. PCT/JP2020/016331, dated Jun. 23, 2020, along with an English translation thereof.

* cited by examiner

PASSAGE PROPRIETY ASSESSMENT DEVICE, PASSAGE MANAGEMENT SYSTEM, PASSAGE PROPRIETY ASSESSMENT METHOD, AND COMPUTER PROGRAM

TECHNICAL FIELD

The present disclosure relates to a passage permission determination apparatus, a passage management system, a passage permission determination method, and a computer program.

BACKGROUND ART

Face authentication has conventionally been used to manage entries to laboratories, factories, entertainment facilities, and the like. While such management is widespread, a problem arises in that a person who is not permitted to enter and exit impersonates a permitted person and attempts to enter by using, for example, a photograph displayed on a portable terminal or paper.

Patent Literature (hereinafter referred to as "PTL") 1 discloses a technique for preventing such impersonation. In the technique of PTL 1, a matching score is calculated which indicates similarity between a face image that is input and a face image that is registered in advance. Then, in a case where the matching score is equal to or larger than a determination threshold value, it is determined that the authentication is successful. On the other hand, in a case where the matching score is less than the determination threshold value, it is determined whether the number of consecutive failures of the authentication is equal to or less than a predetermined number. In a case where the number of consecutive failures is equal to or less than the predetermined number, the degree of impersonation is calculated, and the determination threshold value of the face authentication is increased according to the degree of impersonation. After that, even when the face image of the same person is input and the face authentication is performed again, the determination threshold value is larger than that at the time of the last face authentication, and thus, the impersonation is less likely to be successful.

CITATION LIST

Patent Literature

PTL 1
Japanese Patent No. 5045128

SUMMARY OF INVENTION

Technical Problem

However, with the technique as in PTL 1, it is difficult to detect the impersonation with an accuracy of 100%. For example, a person may be misrecognized as a photograph and determined to be impersonating, or conversely, a photograph may be erroneously determined not being an impersonation. Frequently determining that a person is impersonating and not permitting him/her to pass through causes stagnation of people flow at an entrance/exit and the like; as a result, convenience of a management system using face authentication will be impaired. Thus, in order not to impair such convenience, it is conceivable to lower a criterion for the face authentication. However, lowering the criterion often causes a case of permitting passage by a person who is impersonating by the face authentication on a photograph, which reduces a security level.

An object of the present disclosure is to provide a passage permission determination apparatus, a passage management system, a passage permission determination method, and a computer program each capable of achieving both convenience and maintaining a security level.

Solution to Problem

A passage permission determination apparatus according to an aspect of the present disclosure includes: a passage permission determiner that permits passage through a first passing point by a person in a case where a first face image of the person at the first passing point satisfies an individual permission criterion that is a criterion with which face authentication determines that the person is a pass-permitted person; and an individual permission criterion setter that sets the individual permission criterion for the pass-permitted person at a second passing point after the first passing point to be higher than the individual permission criterion that has been set at the first passing point, in a case where the person who has been permitted for the passage through the first passing point is determined to be impersonating the pass-permitted person, in which the passage permission determiner restricts passage through the second passing point by the person in a case where a second face image of the person at the second passing point does not satisfy the individual permission criterion that has been set higher.

A passage management system according to an aspect of the present disclosure includes: the above-described passage permission determination apparatus; an impersonation determiner that performs determination whether the person at the first passing point is impersonating the pass-permitted person; a memory that stores permitted-person face information regarding a face of the pass-permitted person, the permitted-person face information being used for the face authentication; a first imager that generates the first face image at the first passing point; a face authenticator that determines whether the second face image of the person at the second passing point after the first passing point satisfies the individual permission criterion; and a second passage restrictor that does not restrict the passage through the second passing point in a case where the passage through the second passing point is permitted by the passage permission determiner, and restricts the passage through the second passing point in a case where the passage through the second passing point is not permitted by the passage permission determiner.

A passage permission determination method according to an aspect of the present disclosure includes: permitting passage through a first passing point by a person in a case where a first face image of the person at the first passing point satisfies an individual permission criterion that is a criterion with which face authentication determines that the person is a pass-permitted person; setting the individual permission criterion of the face authentication for the pass-permitted person at a second passing point after the first passing point to be higher than the individual permission criterion that has been set at the first passing point, in a case where the person who has been permitted for the passage through the first passing point is determined to be impersonating the pass-permitted person; and restricting passage through the second passing point by the person in a case where a second face image of the person at the second passing point does not satisfy the individual permission criterion that has been set higher.

A computer program according to an aspect of the present disclosure causes a computer to perform processing including: permitting passage through a first passing point by a person in a case where a first face image of the person at the first passing point satisfies an individual permission criterion that is a criterion with which face authentication determines that the person is a pass-permitted person; setting the individual permission criterion of the face authentication for the pass-permitted person at a second passing point after the first passing point to be higher than the individual permission criterion that has been set at the first passing point, in a case where the person who has been permitted for the passage through the first passing point is determined to be impersonating the pass-permitted person; and restricting passage through the second passing point by the person in a case where a second face image of the person at the second passing point after the first passing point does not satisfy the individual permission criterion that has been set higher.

It should be noted that general or specific embodiments may be implemented as a system, an apparatus, a method, an integrated circuit, a computer program or a storage medium, or any selective combination thereof.

Advantageous Effects of Invention

According to the present disclosure, it is possible to achieve both convenience and maintain a security level.

DESCRIPTION OF EMBODIMENTS

Hereinafter, an embodiment of the present disclosure will be described in detail with reference to the accompanying drawings as appropriate. However, more detailed description than necessary may be omitted. For example, detailed descriptions of already well-known matters and repeated descriptions for substantially the same configuration may be omitted. This is to prevent the following description from becoming unnecessarily redundant and to facilitate understanding by those skilled in the art.

Note that, the accompanying drawings and the following description are provided so that those skilled in the art understand the present embodiment sufficiently, and are not intended to limit the subject matters recited in the claims.

Embodiment 1

<Entry Management System>

Figure 1:
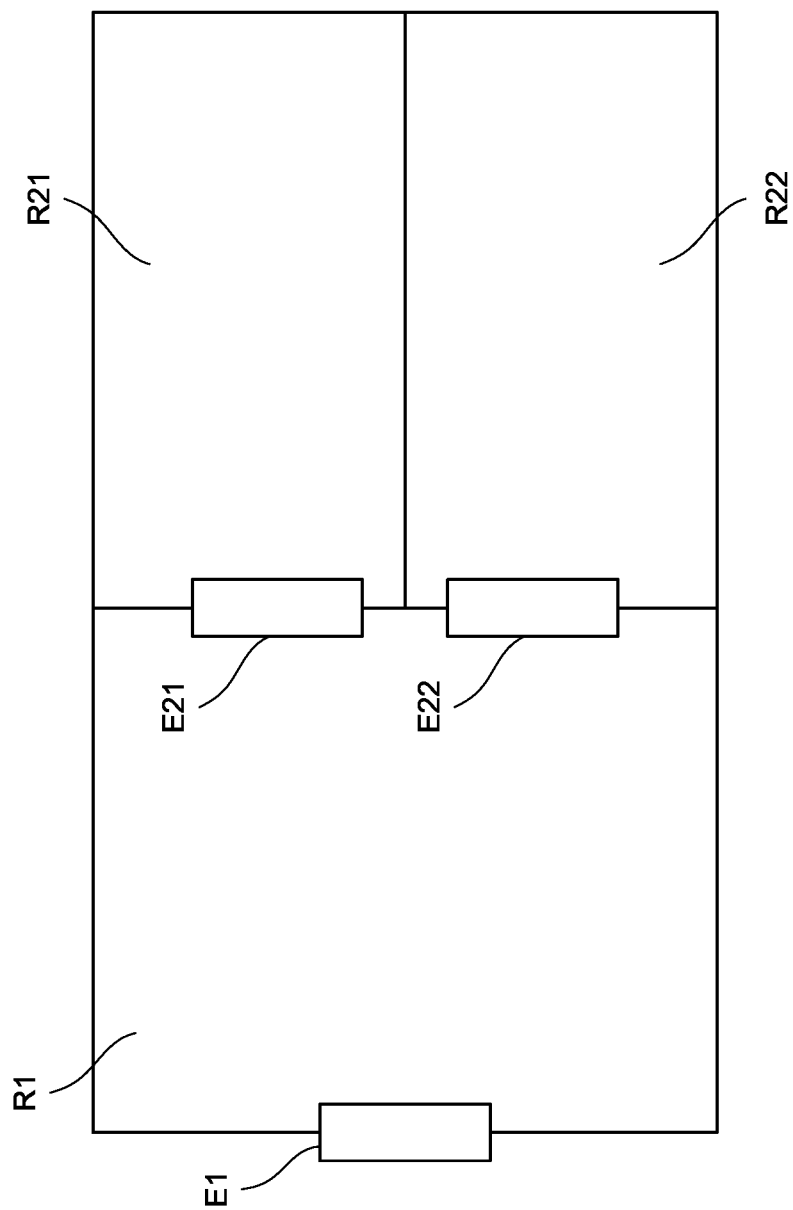
FIG. 1 illustrates a facility that is a management target of an entry management system according to Embodiment 1.

First, an outline of an entry management system which is an exemplary passage management system according to Embodiment 1 will be described with reference to FIGS. 1 and 2.

Entry management system 1 manages entry into an office, a laboratory, a factory, a hospital, an entertainment facility, and the like. In Embodiment 1, a description will be given with entry management system 1 that manages entry into first room R1 and two second rooms R21 and R22 as illustrated in FIG. 1. The number of first rooms may be two or more, and the number of second rooms may be one, or three or more. First room R1 and second rooms R21 and R22 may be a room where entry management is required, and examples thereof include, for example, an entrance hall, a conference room, an office, a hospital room and the like.

Figure 2:
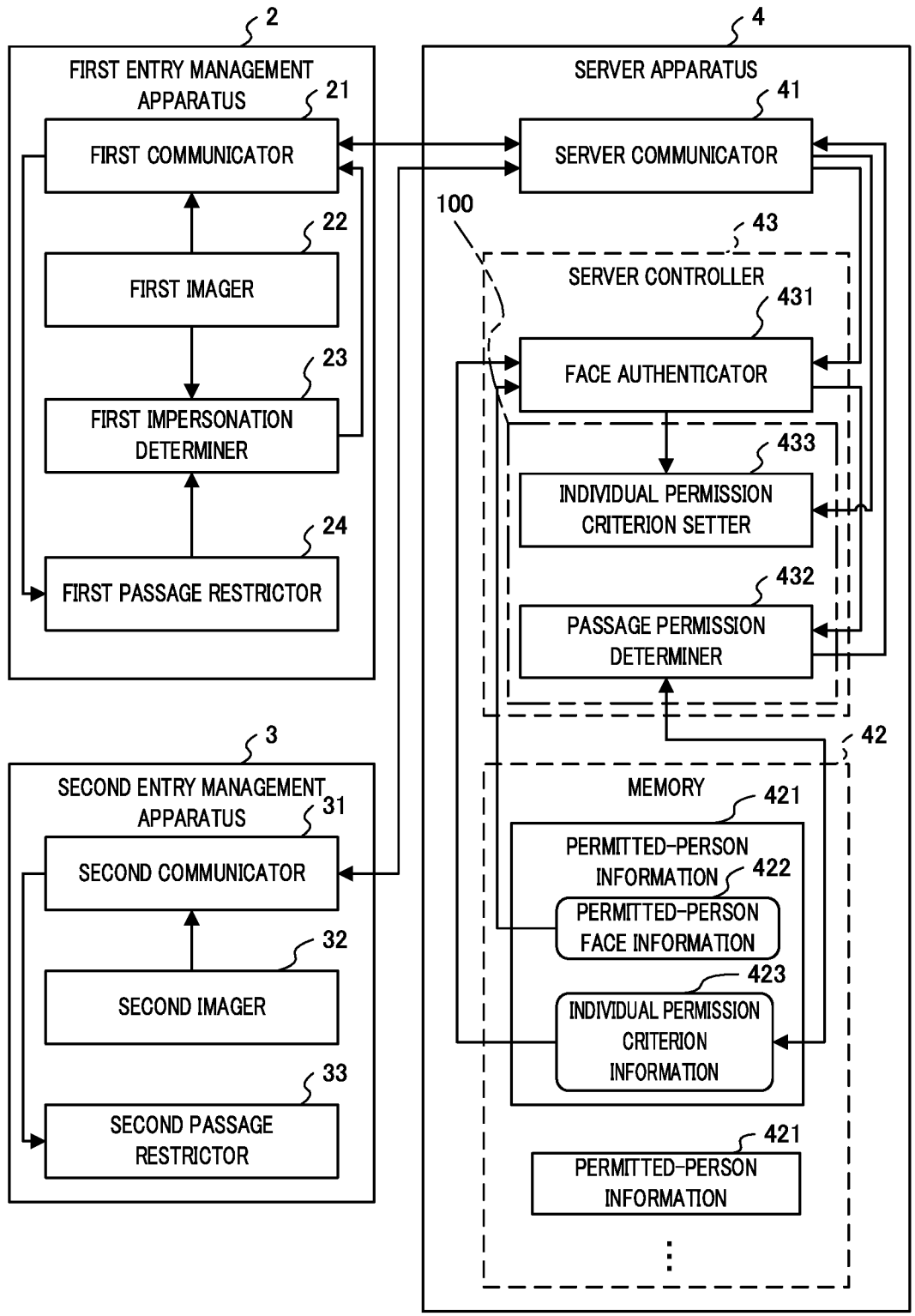
FIG. 2 illustrates an exemplary configuration of the entry management system according to Embodiment 1.

Entry management system 1 includes first entry management apparatus 2, second entry management apparatus 3, and server apparatus 4, as illustrated in FIG. 2.

<First Entry Management Apparatus>

First entry management apparatus 2 manages the entry into first room R1 from first entrance/exit E1, which is an example of the first passing point, based on the control of server apparatus 4. First entry management apparatus 2 includes first communicator 21, first imager 22, first impersonation determiner 23, and first passage restrictor 24.

First communicator 21 is connected to server apparatus 4 via a network and transmits and receives various kinds of information and various kinds of data to and from server apparatus 4.

First imager 22 takes an image of a person in front of first entrance/exit E1 to generate a first face image including the face of the person, and first luminance data corresponding to the first face image and indicating distribution of light reflected off the face on the first face image. An example of a configuration for generating the first face image includes a general camera that generates an RGB image. An example of a configuration for generating the first luminance data includes a camera that takes a monochrome image, but a configuration for obtaining the first luminance data by performing image processing of the RGB image may be used. First imager 22 then transmits the first face image to server apparatus 4 via first communicator 21. First imager 22 also transmits the first face image and the first luminance data to first impersonation determiner 23.

First impersonation determiner 23 determines, based on the first face image and the first luminance data, whether impersonation is performed. First impersonation determiner 23 first specifies a face region of the person from the first face image by using common face detection and/or object detection algorithm(s) Further, with respect to the first luminance data, first impersonation determiner 23 specifies a region corresponding to the face region in the first face image, as a face region in the first luminance data. Then, when distribution of the luminance of the face region is similar to distribution of reflection with respect to a plane shape stored in advance, first impersonation determiner 23 determines that the impersonation is performed. On the other hand, when the luminance of the face region is not similar to the distribution of reflection with respect to the plane shape, it is determined that no impersonation is performed. First impersonation determiner 23 then transmits first impersonation information on whether the impersonation is performed to server apparatus 4 via first communicator 21.

Here, the reason that the impersonation can be determined based on the luminance of the face region will be described. For example, in a case where the person is actually a photograph displayed on a portable terminal, a high luminance region generated by reflection of the face region included in the identical photograph is widely distributed because there is no unevenness in a photograph. On the other hand, in a case where the person is a human, a high luminance region appears with a distinctly different distribution from that of the plane shape because a strong reflection appears in the protruding parts of the face (e.g., head of a nose). For this reason, the impersonation can be determined based on the luminance of the face region and a background region. Note that, as described above, since the high luminance region narrowly appears in the three-dimensional shape, the impersonation can be determined based on a size of an area of the high luminance region. In the case of the planar shape, the high luminance region appears also in a portion continuous with the face, such as a background other than the face region; thus, it is also possible to determine that the impersonation is performed when the high luminance region is present over the face region and the other region.

Incidentally, in such determination of impersonation based on the luminance, even when the person is a pass-permitted person (i.e., person who is permitted to pass through (the same applies hereinafter)), it may be erroneously determined that the impersonation is performed. For example, at an entrance/exit connected to the outdoor, regardless of whether it is a plane shape or a three-dimensional shape, the high luminance region widely appears due to influence of outside light, and thus, it can be erroneously determined that impersonation is performed even for the person himself/herself. Hence, false determination may be included in a result of the impersonation determination by first impersonation determiner 23.

First passage restrictor 24 restricts passage through first entrance/exit E1 based on the control of server apparatus 4. An example of first passage restrictor 24 includes a device that physically restricts the passage by locking a door provided at first entrance/exit E1 and by blocking a part of first entrance/exit E1 with a rod-shaped or plate-shaped object. First passage restrictor 24 acquires, from server apparatus 4 via first communicator 21, first passage permission information on whether to permit the passage through first entrance/exit E1. When determining not to permit the passage based on the first passage permission information, first passage restrictor 24 restricts the passage through first entrance/exit E1 whereas it does not restrict the passage through first entrance/exit E1 when determining to permit the passage.

<Second Entry Management Apparatus>

Second entry management apparatus 3 manages entry into second rooms R21 and R22 from second entrances/exits E21 and E22, which are examples of the second passing point, based on the control of server apparatus 4. Second entry management apparatus 3 includes second communicator 31, second imager 32, and second passage restrictor 33. Although FIG. 2 illustrates only one second entry management apparatus 3, a total of two second entry management apparatuses 3 that respectively manage second rooms R21 and R22 are provided in entry management system 1. Further, since two second entry management apparatuses 3 have a similar configuration; here, a description will be given of second entry management apparatus 3 that manages the entry into second room R21.

Second communicator 31 is connected to server apparatus 4 via a network, and transmits and receives various kinds of information and various kinds of data to and from server apparatus 4.

Second imager 32 takes an image of a person in front of second entrance/exit E21 to generate a second face image including the face of the person. An example of a configuration for generating the second face image includes a general camera common to the camera of first imager 22. Second imager 32 then transmits the second face image to server apparatus 4 via second communicator 31.

Second passage restrictor 33 restricts passage through second entrance/exit E21 based on the control of server apparatus 4. An example of second passage restrictor 33 includes a device that physically restricts the passage which has been described in first passage restrictor 24. Second passage restrictor 33 acquires, from server apparatus 4 via second communicator 31, second passage permission information on whether to permit the passage through second entrance/exit E21. When determining not to permit the passage based on the second passage permission information, second passage restrictor 33 restricts the passage through second entrance/exit E21 whereas it does not restrict the passage through second entrance/exit E21 when determining to permit the passage. Note that, second passage restrictor 33 for restricting the passage through second entrance/exit E21 and second passage restrictor 33 for restricting the passage through second entrance/exit E22 may have the same structure or a different structure.

<Server Apparatus>

Server apparatus 4 controls first entry management apparatus 2 and second entry management apparatus 3 to manage entry into first room R1 and second rooms R21 and R22. Server apparatus 4 includes server communicator 41, memory 42, and server controller 43.

Server communicator 41 is connected to first communicator 21 and second communicator 31 via a network, and transmits and receives various kinds of information and various kinds of data to and from first entry management apparatus 2 and second entry management apparatus 3.

Memory 42 stores permitted-person information 421 regarding a pass-permitted person who is permitted to enter first room R1 and second rooms R21 and R22. When there are a plurality of pass-permitted persons, permitted-person information 421 having a different content for each pass-permitted person is stored in memory 42. Permitted-person information 421 includes permitted-person face information 422 and individual permission criterion information 423.

Permitted-person face information 422 is information regarding the feature amount of the face of the pass-permitted person. Permitted-person face information 422 may be in any form as long as it can be used as a matching target at the time of face authentication, and may be, for example, an image of a face.

Individual permission criterion information 423 indicates a criterion used for passing permission determination at the time of face authentication. The criterion indicated by individual permission criterion information 423 of Embodiment 1 is an individual threshold value of a face matching score to be described later. This individual threshold value is set to the same initial threshold value for each pass-permitted person unless it is determined that the impersonation is performed in first entry management apparatus 2. When it is determined that the impersonation is performed, individual permission criterion information 423 is changed for each pass-permitted person by individual permission criterion setter 433 to be described later of server controller 43.

Incidentally, permitted-person information 421 may further include, for example, registrant information identifying the pass-permitted person such as name, sex, and/or age.

Server controller 43 includes face authenticator 431, passage permission determiner 432, and individual permission criterion setter 433. Passage permission determiner 432 and individual permission criterion setter 433 constitute passage permission determination apparatus 100.

Face authenticator 431 performs face authentication for the first face image and the second face image. The face authentication can be performed using a publicly known technique. For example, face authenticator 431 acquires the first face image from first entry management apparatus 2 via server communicator 41 and specifies the face region on the first face image. Next, face authenticator 431 detects a feature point from the face region and calculates the feature amount of the feature point and/or in the vicinity thereof. Face authenticator 431 then matches the feature amount of the first face image with the feature amount of permitted-person face information 422 stored in memory 42 to calculate a face authentication score. The face authentication score is calculated such that the higher the degree of similarity between the face on the first face image and the face identified by the feature amount of permitted-person face information 422 is, the larger the value thereof is.

Face authenticator 431 then extracts permitted-person information 421 including permitted-person face information 422 with the largest face authentication score. In a case where the face authentication score is equal to or larger than the individual threshold value indicated by individual permission criterion information 423 of permitted-person information 421 that has been extracted, face authenticator 431 determines that the person on the first face image is a pass-permitted person corresponding to permitted-person information 421. On the other hand, in a case where the face authentication score is less than the individual threshold value, face authenticator 431 determines that the person on the first face image is not registered in memory 42 as the pass-permitted person. Then, face authenticator 431 transmits first face authentication result information indicating whether the person on the first face image is the pass-permitted person to passage permission determiner 432. Moreover, when the face authentication score is equal to or larger than the individual threshold value, face authenticator 431 transmits first identification information identifying the pass-permitted person corresponding to the first face image to individual permission criterion setter 433.

Incidentally, in the case where the person is actually a photograph of the pass-permitted person, positions of the constituent parts of the face, such as the eyes and nose, in the photograph are similar to those of the pass-permitted person, so that the face authentication score may be equal to or larger than the individual threshold value. However, the unevenness of the constituent parts of the face on the photograph is small compared with the human. Thus, when the person is actually a photograph, the degree of similarity of feature amount is not higher than that of the human, and the face authentication score also becomes smaller than that of the human.

Face authenticator 431 acquires the second face image from second entry management apparatus 3 via server communicator 41, matches the feature amount of the second face image with the feature amount of permitted-person face information 422, in the same manner as the first face image, to calculate the face authentication score. Thereafter, face authenticator 431 extracts permitted-person information 421 including permitted-person face information 422 with the largest face authentication score, and determines that the person on the second face image is the pass-permitted person corresponding to permitted-person information 421 in a case where the face authentication score is equal to or larger than the individual threshold value indicated by individual permission criterion information 423 of permitted-person information 421 that has been extracted. On the other hand, in a case where the face authentication score is less than the individual threshold value, face authenticator 431 determines that the person on the second face image is not registered as the pass-permitted person. Then, for the second face image, face authenticator 431 transmits second face authentication result information similar to the first face authentication result information to passage permission determiner 432 and transmits second identification information similar to the first identification information to individual permission criterion setter 433.

Passage permission determiner 432 acquires the first face authentication result information from face authenticator 431. When determining that the person on the first face image is the pass-permitted person, passage permission determiner 432 transmits, to first entry management apparatus 2 via server communicator 41, the first passage permission information indicating that the passage through first entrance/exit E1 is permitted. On the other hand, when determining that the person on the first face image is not the pass-permitted person, passage permission determiner 432 transmits, to first entry management apparatus 2, the first passage permission information indicating that the passage through first entrance/exit E1 is not permitted.

Passage permission determiner 432 acquires the second face authentication result information from face authenticator 431. When determining that the person on the second face image is the pass-permitted person, passage permission determiner 432 transmits, to second entry management apparatus 3, the second passage permission information indicating that the passage through second entrances/exits E21 and E22 is permitted. On the other hand, when determining that the person on the second face image is not the pass-permitted person, passage permission determiner 432 transmits, to second entry management apparatus 3, the second passage permission information indicating that the passage through second entrances/exits E21 and E22 is not permitted.

Individual permission criterion setter 433 sets an individual threshold value of individual permission criterion information 423 based on the determination result of the impersonation in first entry management apparatus 2. Individual permission criterion setter 433 acquires the first identification information from face authenticator 431 and acquires the first impersonation information from first entry management apparatus 2 via server communicator 41. Next, when determining that the impersonation is performed, individual permission criterion setter 433 extracts permitted-person information 421 on the pass-permitted person identified by the first identification information. Individual permission criterion setter 433 then changes the individual threshold value of individual permission criterion information 423 for permitted-person information 421 to a value obtained by adding the value of A (A is a positive number) to the individual threshold value. That is, the individual threshold value is set to the value resulting from addition of the value of A to the initial threshold value. On the other hand, when determining that the impersonation is not performed, individual permission criterion setter 433 does not change the individual threshold value of individual permission criterion information 423 for permitted-person information 421, which is identified by the first identification information. That is, the individual threshold value is kept at the initial threshold value.

When acquiring the second identification information from face authenticator 431, individual permission criterion setter 433 extracts permitted-person information 421 of the pass-permitted person identified by the second identification information. Then, in a case where the individual threshold value of individual permission criterion information 423 for permitted-person information 421 is not the initial threshold value, individual permission criterion setter 433 changes the individual threshold value to a value obtained by subtracting the value of A from the individual threshold value. That is, the individual threshold value is returned to the initial threshold value. On the other hand, in a case where the individual threshold value is the initial threshold value, individual permission criterion setter 433 does not change individual permission criterion information 423. That is, the individual threshold value is kept at the initial threshold value.

<Flow of Entry Management Processing>

Next, a flow of entry management processing in entry management system 1 will be described with reference to flowcharts illustrated in FIGS. 3 and 4. This entry management processing includes a passage permission determination method. In the following, a description will be given with a case of managing the entry into first room R1 and second room R21; note that, the same processing is performed when managing the entry into second room R22.

Figure 3:
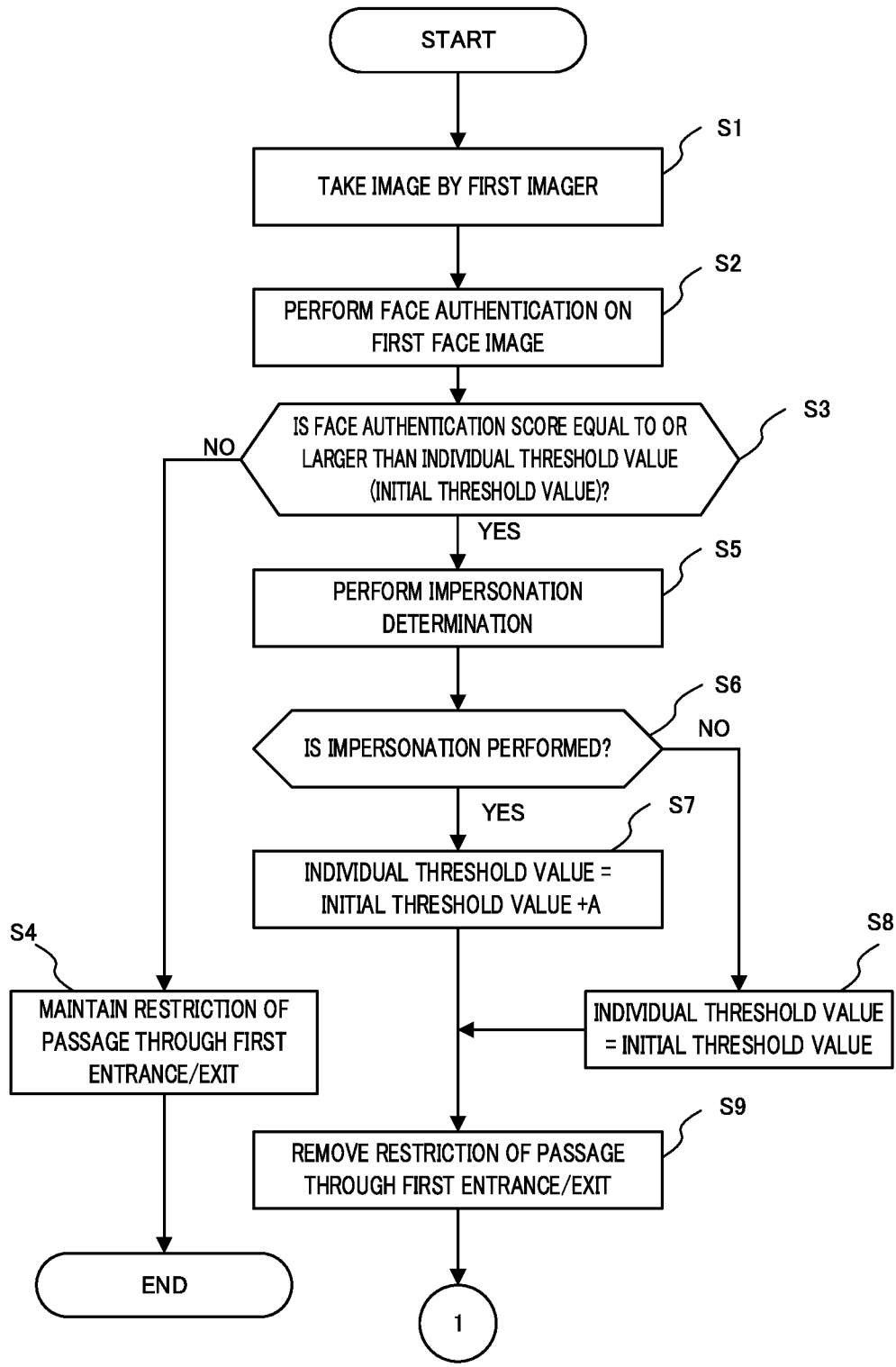
FIG. 3 is a flowchart illustrating entry management processing according to Embodiment 1.

As illustrated in FIG. 3, first entry management apparatus 2 causes first imager 22 to take an image of the person at first entrance/exit E1 (S1), transmit the first face image to server apparatus 4, and transmit the first face image and the first luminance data to first impersonation determiner 23. The first face image and the first luminance data obtained by the process of S1 are generated by taking an image of a person when no impersonation is performed while they are generated by taking an image of a photograph when impersonation is performed.

Next, server controller 43 of server apparatus 4 causes face authenticator 431 to perform the face authentication on the first face image (S2). In the process of S2, face authenticator 431 extracts permitted-person information 421 including permitted-person face information 422 with the largest face authentication score. Face authenticator 431 then determines whether the face authentication score is equal to or larger than the individual threshold value corresponding to permitted-person information 421 that has been extracted, that is, whether the face authentication score is equal to or larger than the initial threshold value (S3). When face authenticator 431 determines that the face authentication score is not equal to or larger than the individual threshold value (S3: NO), server controller 43 causes passage permission determiner 432 to transmit, to first entry management apparatus 2, the first passage permission information not permitting passage through first entrance/exit E1. The face authentication score does not exceed the individual threshold value when the person at the time of generation of the first face image is a person other than a pass-permitted person. First entry management apparatus 2 that has received the first passage permission information not permitting the passage causes first passage restrictor 24 to maintain restriction of the passage through first entrance/exit E1 (S4). Thus, the entry management processing is completed.

On the other hand, when face authenticator 431 determines that the face authentication score is equal to or larger than the individual threshold value (S3: YES), server controller 43 causes face authenticator 431 to transmit first identification information identifying the pass-permitted person on the first face image to individual permission criterion setter 433. In addition, server controller 43 causes passage permission determiner 432 to transmit the first passage permission information permitting the passage through first entrance/exit E1 to first entry management apparatus 2. The face authentication score becomes equal to or larger than the individual threshold value when the person at the time of generation of the first face image is the pass-permitted person. Further, in the case where the person is a photograph of the pass-permitted person, as described above, the face authentication score may be equal to or larger than the individual threshold value; however, the score is smaller than that of the pass-permitted person. For example, when the initial threshold value is 350, the face authentication score of the pass-permitted person becomes 800, and the face authentication score of the photograph of the pass-permitted person becomes 400.

First entry management apparatus 2 that has received the first passage permission information permitting the passage causes first impersonation determiner 23 to perform impersonation determination based on the first face image and the first luminance data (S5) and transmit first impersonation information to server apparatus 4. Incidentally, as described above, even when the person is the pass-permitted person, it may be erroneously determined that impersonation is performed.

Server controller 43 causes individual permission criterion setter 433 to determine whether the impersonation is performed based on the first impersonation information (S6). When it is determined that the impersonation is performed (S6: YES), individual permission criterion setter 433 changes the individual threshold value of individual permission criterion information 423 corresponding to the first identification information to a value obtained by adding the value of A to the initial threshold value (S7). The changed individual threshold value is preferably larger than the face authentication score obtained when the person at the time of generation of the second face image is a photograph of the pass-permitted person and smaller than the face authentication score obtained when the person is the pass-permitted person. For example, the individual threshold value is changed from 350 that is the initial threshold value to 450 by adding 100 thereto. On the other hand, when determining that the impersonation is not performed (S6: NO), individual permission criterion setter 433 maintains the individual threshold value of individual permission criterion information 423 corresponding to the first identification information to the initial threshold value (350) (S8). In other words, individual permission criterion information 423 makes the determination criterion for the face authentication with respect to the second face image when the impersonation is performed higher than that when the impersonation is not performed.

After the process of S7 or S8, first entry management apparatus 2 causes first passage restrictor 24 to remove the restriction of the passage through first entrance/exit E1 based on the first passage permission information permitting the passage (S9). In other words, in addition to the case of determining that the impersonation is not performed, in a case of determining that it is performed, the restriction of the passage through first entrance/exit E1 is also removed. Note that, the process of S9 may be performed before or after any one of processes of S5 to S8, or at the same time.

Figure 4:
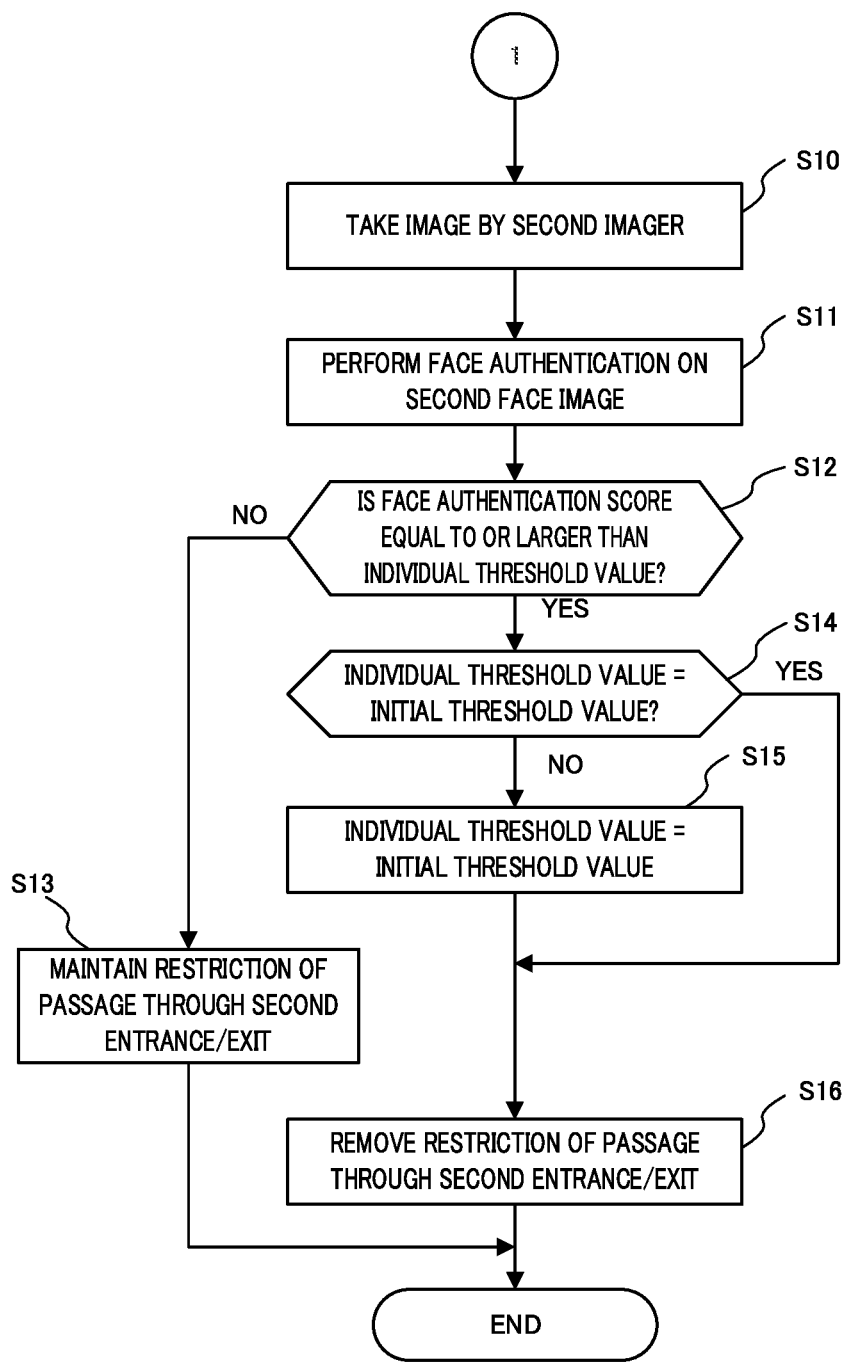
FIG. 4 is a flowchart illustrating the entry management processing and continuous processes of the flowchart of FIG. 3 according to Embodiment 1.

Thereafter, as illustrated in FIG. 4, second entry management apparatus 3 causes second imager 32 to take an image of the person in front of second entrance/exit E21 having passed through first entrance/exit E1 (S10) and transmits the second face image to server apparatus 4. Next, server controller 43 of server apparatus 4 causes face authenticator 431 to perform face authentication on the second face image (S11). In the process of S11, face authenticator 431 extracts permitted-person information 421 including permitted-person face information 422 with the largest face authentication score and determines whether the face authentication score is equal to or larger than the individual threshold value corresponding to permitted-person information 421 that has been extracted (S12).

When face authenticator 431 determines that the face authentication score is not equal to or larger than the individual threshold value (S12: NO), server controller 43 causes passage permission determiner 432 to the transmit second passage permission information not permitting passage through second entrance/exit E21 to second entry management apparatus 3. Second entry management apparatus 3 that has received the second passage permission information not permitting the passage causes second passage restrictor 33 to maintain restriction of the passage through second entrance/exit E21 (S13). Thus, the restriction of the passage through second entrance/exit E21 is maintained when the person at the time of generation of the second face image is the photograph of the pass-permitted person.

Figure 5:
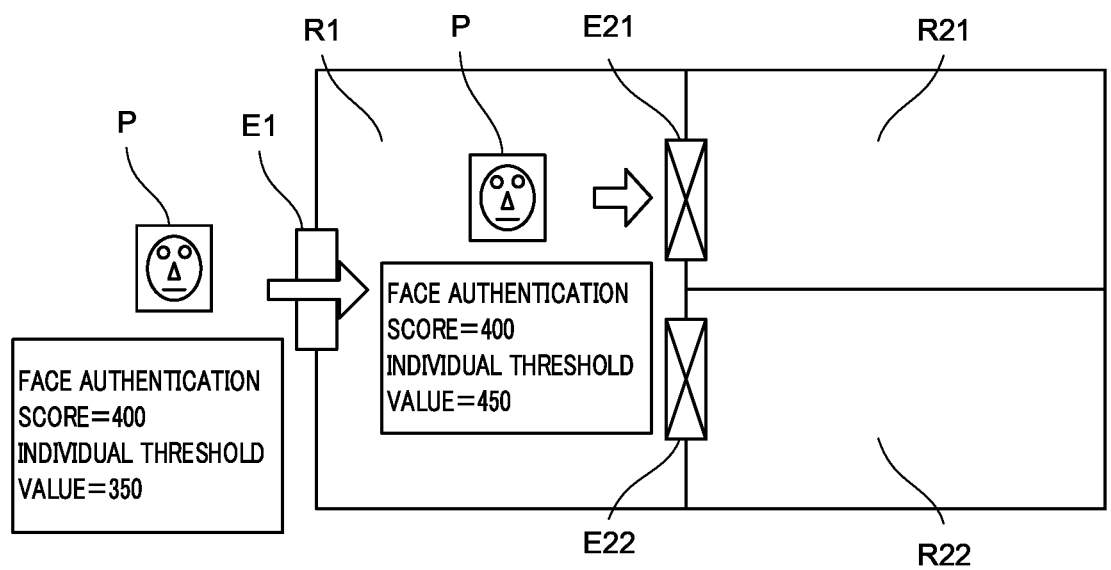
FIG. 5 illustrates an entry management state according to Embodiment 1.

For example, as illustrated in FIG. 5, in a case where a person is photograph P of a pass-permitted person, he/she is determined to be impersonating at first entrance/exit E1. A holder of photograph P is able to pass through first entrance/exit E1 because the face authentication score at first entrance/exit E1 is 400 and the individual threshold value for first entrance/exit E1 is 350 that is the initial threshold value. However, the individual threshold value for second entrance/exit E21 is raised to 450, and the face authentication score at second entrance/exit E21 is about 400; accordingly, the holder of photograph P is unable to pass through second entrance/exit E21.

On the other hand, when face authenticator 431 determines that the face authentication score is equal to or larger than the individual threshold value (S12: YES), server controller 43 causes face authenticator 431 to transmit second identification information identifying the pass-permitted person on the second face image to individual permission criterion setter 433. In addition, server controller 43 causes passage permission determiner 432 to transmit second passage permission information permitting the passage through second entrance/exit E21 to second entry management apparatus 3.

Individual permission criterion setter 433 that has acquired the second identification information determines whether the individual threshold value of individual permission criterion information 423 corresponding to the second identification information is the initial threshold value (S14). When determining that the individual threshold value is not the initial threshold value (S14: NO), individual permission criterion setter 433 returns the individual threshold value of individual permission criterion information 423 corresponding to the second identification information to the initial threshold value (S15). On the other hand, when determining the individual threshold value is the initial threshold value, individual permission criterion setter 433 maintains the individual threshold value without changes.

After the process of S15 or after the determination that the individual threshold value is the initial threshold value (S14: YES), second entry management apparatus 3 causes second passage restrictor 33 to remove the restriction of the passage through second entrance/exit E21 based on the second passage permission information permitting the passage (S16). The face authentication score is equal to or larger than the individual threshold value when the person at the time of generation of the second face image is the pass-permitted person. Note that, the process of S16 may be performed before or after any one of the processes of S14 and S15, or at the same time.

For example, in a case where the luminance distribution on a face of a person has a pattern similar to that of a plane shape due to the influence of outside light, it is erroneously determined as the impersonation at first entrance/exit E1. However, the face authentication score at first entrance/exit E1 is, for example, 400, and the individual threshold value for first entrance/exit E1 is 350 that is the initial threshold value; thus, the pass-permitted person is able to pass through first entrance/exit E1. In addition, although the individual threshold value for second entrance/exit E21 has been raised to 450, the face authentication score at second entrance/exit E21 becomes approximately 800 as a result of the pass-permitted person moving to an environment less susceptible to the outside light. Consequently, the pass-permitted person is able to pass through second entrance/exit E21. Incidentally, the face authentication score has risen from 400 to 800 is because an environment which causes erroneous determination of the impersonation also adversely affects the face authentication; for example, extracting the feature amount is made difficult. Further, even in a situation where the face authentication score may be reduced; for example, in a case where the pass-permitted person moves or does not face to second imager 32 during imaging the second face image, the pass-permitted person is likely to take a cooperative action to improve the above situation so as to increase the face authentication score. As a result, the face authentication score of the face authentication for the second face image is finally larger than 450 that is the individual threshold value, and thus, the pass-permitted person is able to pass through second entrance/exit E21. Incidentally, in the case of the impersonation is performed by using a photograph, it is impossible to take the cooperative action such as changing an angle of the face, and thus, in a case where the pass-permitted person is impersonating, he/she is unable to pass through second entrance/exit E21.

Summary of Embodiment 1

In Embodiment 1, when determining that the impersonation is performed based on the first face image of the person at first entrance/exit E1, entry management system 1 sets an individual threshold value for the pass-permitted person in the face authentication at second entrances/exits E21 and E22 to be larger than that when determining that the impersonation is not performed. Next, entry management system 1 performs the face authentication based on the second face image of the person at second entrances/exits E21 and E22 and permitted-person face information 422. When the second face image is equal to or larger than the individual threshold value, entry management system 1 permits the passage through second entrances/exits E21 and E22, and when the second face image is not equal to or larger than the individual threshold value, entry management system 1 does not permit the passage through second entrances/exits E21 and E22.

Thus, even when determining that the impersonation is performed at first entrance/exit E1, permitting the passage through first entrance/exit E1 makes it possible to suppress stagnation of people flow and maintain convenience of entry management system 1 using the face authentication. In addition, when it is determined that the impersonation is performed at first entrance/exit E1, the individual threshold value for the face authentication at second entrances/exits E21 and E22 is increased. Thus, even when the holder of the photograph for the impersonation is able to pass through first entrance/exit E1, the face authentication at second entrances/exits E21 and E22 makes it impossible to pass through second entrances/exits E21 and E22, and thereby a security level can be maintained.

In Embodiment 1, the face authentication is performed even at first entrance/exit E1.

This enables the security level at first entrance/exit E1 to be maintained.

In Embodiment 1, when it is determined that the impersonation is performed at first entrance/exit E1, individual permission criterion setter 433 sets an individual threshold value for second entrances/exits E21 and E22 to be larger than an individual threshold value for first entrance/exit E1, and when it is determined that the impersonation is not performed, it maintains the individual threshold value for first entrance/exit E1 without changes.

Thus, when it is determined that the impersonation is not performed at first entrance/exit E1, processing load of individual permission criterion setter 433 can be reduced.

In Embodiment 1, when the face authentication score is equal to or larger than the individual threshold value in the face authentication at second entrances/exits E21 and E22 after it is determined that the impersonation is performed at first entrance/exit E1, individual permission criterion setter 433 returns the individual threshold value to the initial threshold value.

In a case where the individual threshold value is not returned to the initial threshold value, the permission criterion for the next face authentication at first entrance/exit E1 is kept high. As a result, the pass-permitted person may be erroneously determined as not a pass-permitted person when passing through first entrance/exit E1. In contrast, returning the individual threshold value to the initial threshold value can reduce the possibility of occurrence of erroneous determination as being not the pass-permitted person in the next face authentication at first entrance/exit E1.

In Embodiment 1, face authenticator 431 is placed in server apparatus 4, and first impersonation determiner 23 is placed in first entry management apparatus 2.

Thus, placing face authenticator 431 with large processing load in server apparatus 4 allows reducing processing load of first entry management apparatus 2.

Embodiment 2

<Entry Management System>

First, an outline of an entry management system which is an exemplary passage management system according to Embodiment 2 will be described with reference to FIGS. 6 and 7. Incidentally, the same configurations as those of Embodiment 1 are denoted by the same names and reference numerals as in Embodiment 1, and detailed descriptions thereof will be thus omitted.

Figure 6:
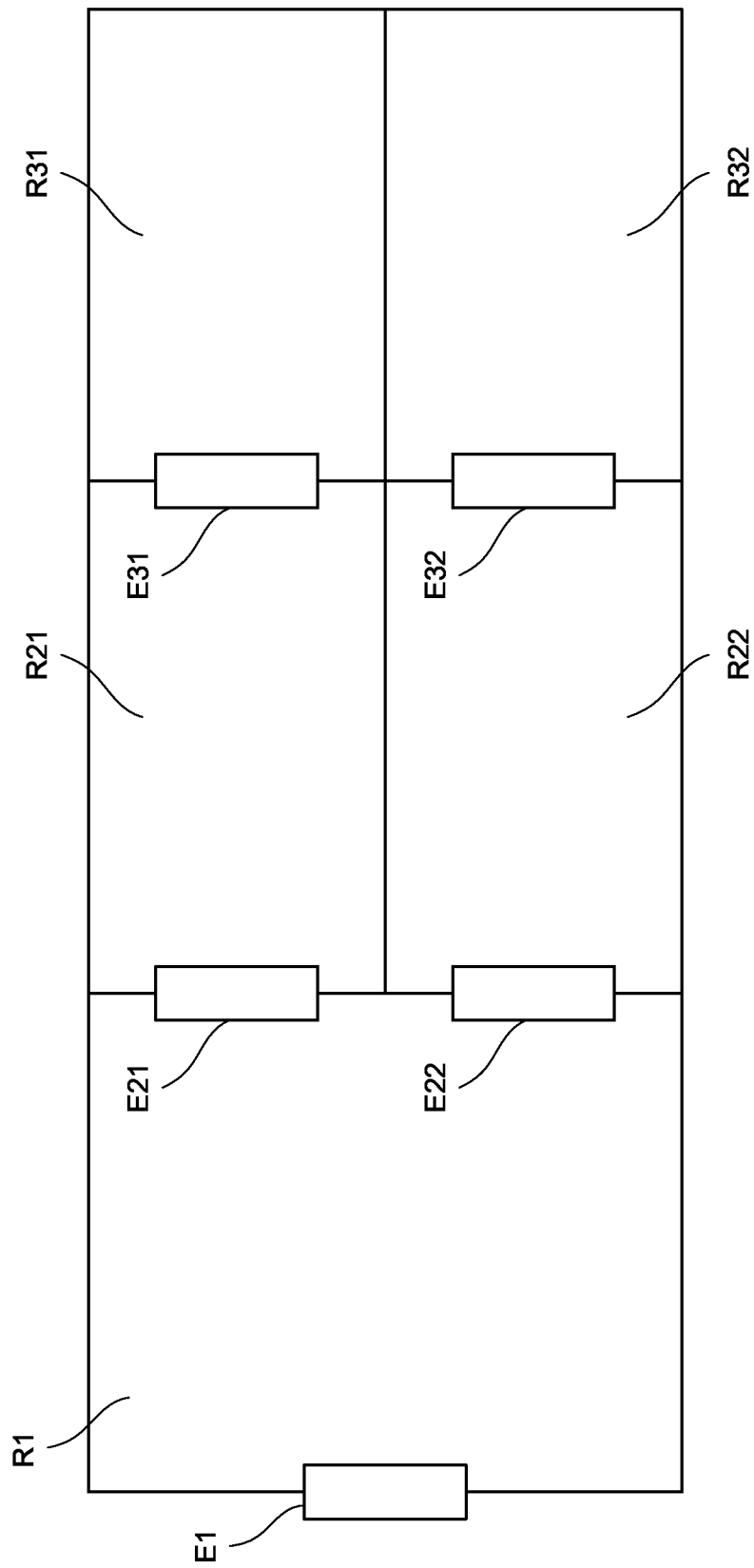
FIG. 6 illustrates a facility that is a management target of an entry management system according to Embodiment 2.
Figure 7:
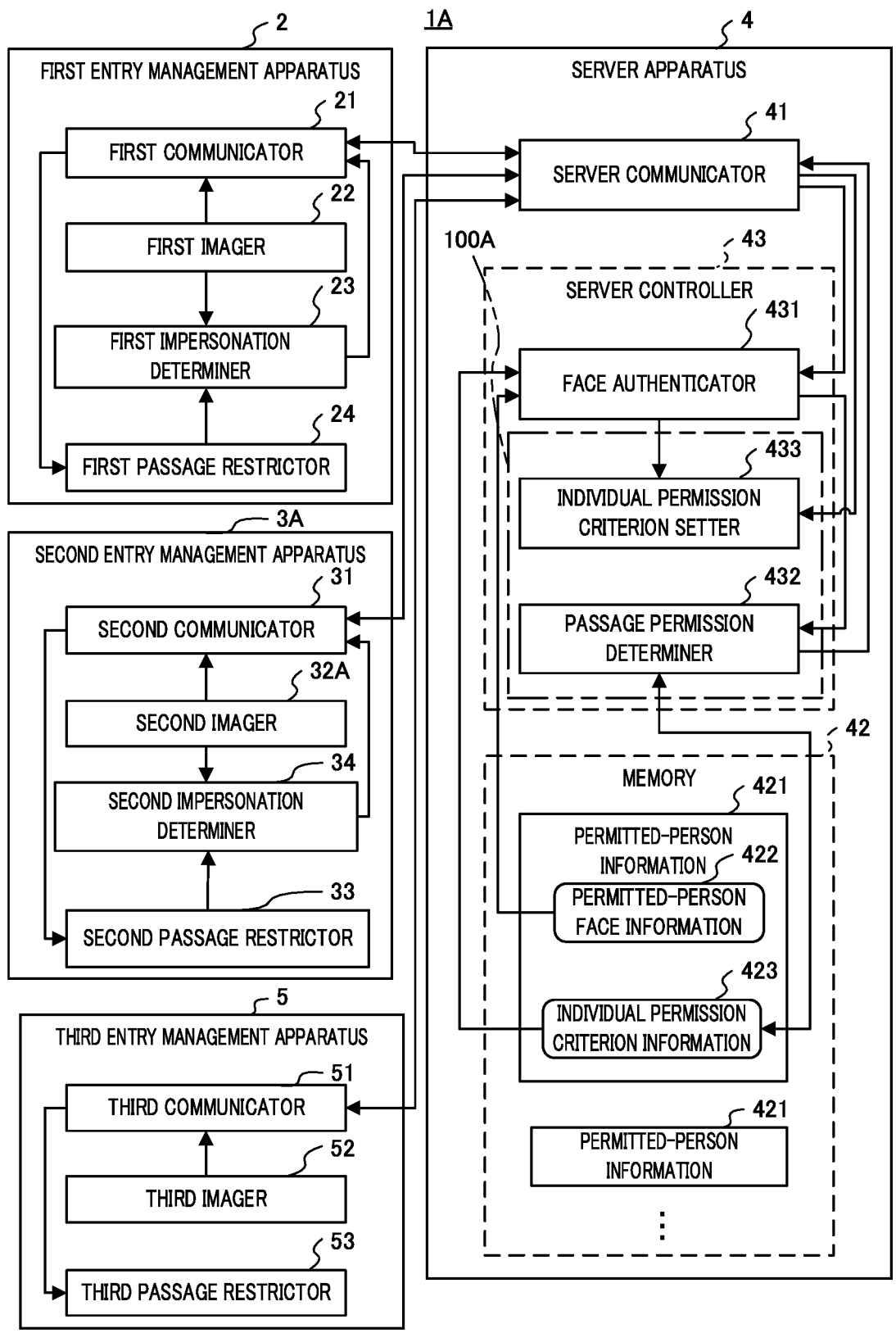
FIG. 7 illustrates an exemplary configuration of the entry management system according to Embodiment 2.

Entry management system 1A manages entry into first room R1, two second rooms R21 and R22, and two third rooms R31 and R32 as illustrated in FIG. 6. Entry management system 1A includes first entry management apparatus 2, second entry management apparatus 3A, third entry management apparatus 5, and server apparatus 4 as illustrated in FIG. 7. Since first entry management apparatus 2 and server apparatus 4 have the same configurations as those of entry management system 1 of Embodiment 1, other configurations will be described in detail.

<Second Entry Management Apparatus>

Second entry management apparatus 3A includes second communicator 31, second imager 32A, second passage restrictor 33, and second impersonation determiner 34. Second imager 32A generates a second face image and second luminance data similar to first imager 22. Second imager 32A then transmits the second face image to server apparatus 4 and transmits the second face image and the second luminance data to second impersonation determiner 34. Similar to first impersonation determiner 23, second impersonation determiner 34 determines whether impersonation is performed at second entrances/exits E21 and E22 based on the second face image and the second luminance data. Next, second impersonation determiner 34 transmits second impersonation information indicating a determination result to server apparatus 4.

Passage permission determiner 432 and individual permission criterion setter 433 constitute passage permission determination apparatus 100A.

<Third Entry Management Apparatus>

Third entry management apparatus 5 manages entry into third rooms R31 and R32 from third entrances/exits E31 and E32, which are examples of third passing points, based on the control of server apparatus 4. Third entry management apparatus 5 includes third communicator 51, third imager 52, and third passage restrictor 53 having the same functions respectively as second communicator 31, second imager 32 and second passage restrictor 33 of Embodiment 1. Although FIG. 7 illustrates only one third entry management apparatus 5, a total of two third entry management apparatuses 5 that respectively manage third rooms R31 and R32 are provided in entry management system 1A. Here, third entry management apparatus 5 that manages the entry into third room R31 will be described.

Third communicator 51 is connected to server apparatus 4 via a network and transmits and receives various kinds of information and various kinds of data to and from server apparatus 4. Third imager 52 takes an image of a person in front of third entrance/exit E31 and transmits a third face image including the face of the person to server apparatus 4. Third passage restrictor 53 acquires third passage permission information on whether to permit the passage through third entrance/exit E31 from server apparatus 4 and restricts the passage through third entrance/exit E31 based on the third passage permission information.

<Flow of Entry Management Processing>

Next, a flow of entry management processing in entry management system 1A will be described. This entry management processing includes a passing permission determination method. In the following, a description will be given with a case of managing the entry into first room R1, second room R21 and third room R31; note that, the same processing is performed when managing the entry into second room R22 and third room R32.

First entry management apparatus 2 and server apparatus 4 manage entry into first room R1 by performing the processes of S1 to S9 in FIG. 3. After the process of S9, second entry management apparatus 3A and server apparatus 4 perform the same processes as the processes of S1 to S9 when managing the entry into second room R21.

First, second entry management apparatus 3A takes an image of a person at second entrance/exit E21, transmits the second face image to server apparatus 4, and transmits the second face image and the second luminance data to second impersonation determiner 34. Next, server apparatus 4 causes face authenticator 431 to perform face authentication on the second face image. In the face authentication, face authenticator 431 determines whether a face authentication score is equal to or larger than the individual threshold value of permitted-person information 421 that has been extracted based on the second face image. In a case where it is determined that the impersonation is performed at first entrance/exit E1, the individual threshold value used at this time is a value obtained by adding the value of A to the initial threshold value, and in a case where it is determined that the impersonation is not performed, the individual threshold value to be used is the initial threshold value.

When face authenticator 431 determines that the face authentication score is not equal to or larger than the individual threshold value, passage permission determiner 432 transmits, to second entry management apparatus 3A, second passage permission information not permitting the passage through second entrance/exit E21; on the other hand, passage permission determiner 432 transmits, to second entry management apparatus 3A, the second passage permission information permitting the passage through second entrance/exit E21 when it is determined that the face authentication score is equal to or larger than the individual threshold value. Further, when determining that the face authentication score is equal to or larger than the individual threshold value, face authenticator 431 transmits second identification information identifying the pass-permitted person on the second face image to individual permission criterion setter 433. Second entry management apparatus 3A that has received the second passage permission information maintains or removes restriction of the passage through second entrance/exit E21 based on the second passage permission information.

Second entry management apparatus 3A that has received the second passage permission information causes second impersonation determiner 34 to perform impersonation determination and transmits the second impersonation information to server apparatus 4. Individual permission criterion setter 433 of server controller 43 determines whether the impersonation is performed based on the second impersonation information, and when determining that the impersonation is performed, changes the individual threshold value of individual permission criterion information 423 corresponding to the second identification information to a value obtained by adding the value of B (B is a positive number) to the individual threshold value. On the other hand, when determining that the impersonation is not performed, individual permission criterion setter 433 maintains the individual threshold value of individual permission criterion information 423 corresponding to the second identification information without changes. In other words, individual permission criterion information 423 makes the determination criterion for the face authentication with respect to the third face image when the impersonation is performed higher than that when the impersonation is not performed.

Thereafter, third entry management apparatus 5 and server apparatus 4 perform the same processes as the processes of S10 to S16 when managing the entry into third room R31.

First, third entry management apparatus 5 causes third imager 52 to take an image of a person in front of third entrance/exit E31 having passed through second entrance/exit E21 and transmits the third face image to server apparatus 4. Next, server controller 43 of server apparatus 4 causes face authenticator 431 to perform the face authentication on the third face image. In the face authentication, face authenticator 431 determines whether the face authentication score is equal to or larger than the individual threshold value of permitted-person information 421 that has been extracted based on the third face image. In a case where it is determined that the impersonation is performed at both first entrance/exit E1 and second entrance/exit E21, and the individual threshold value used at this time is a value obtained by adding the values of A and B to the initial threshold value, while it is determined that the impersonation is not performed at both first entrance/exit E1 and second entrance/exit E21, the individual threshold value to be used is the initial threshold value. Moreover, in a case where it is determined that the impersonation is performed at first entrance/exit E1 but is not performed at second entrance/exit E21, the individual threshold value to be used is a value obtained by adding the value of A to the initial threshold value. Furthermore, in a case where it is determined that the impersonation is not performed at first entrance/exit E1 but is performed at second entrance/exit E21, the individual threshold value to be used is a value obtained by adding the value of B to the initial threshold value.

When face authenticator 431 determines that the face authentication score is not equal to or larger than the individual threshold value, passage permission determiner 432 transmits, to third entry management apparatus 5, third passage permission information not permitting the passage through third entrance/exit E31; on the other hand, passage permission determiner 432 transmits, to third entry management apparatus 5, third passage permission information permitting the passage through third entrance/exit E31 when it is determined that the face authentication score is equal to or larger than the individual threshold value. Further, when determining that the face authentication score is equal to or larger than the individual threshold value, face authenticator 431 transmits third identification information identifying the pass-permitted person on the third face image to individual permission criterion setter 433. Third entry management apparatus 5 that has received the third passage permission information maintains or removes restriction of the passage through third entrance/exit E31 based on the third passage permission information.

Individual permission criterion setter 433 that has acquired the third identification information determines whether the individual threshold value of individual permission criterion information 423 corresponding to the third identification information is the initial threshold value. Individual permission criterion setter 433 returns the individual threshold value to the initial threshold value when determining as being not the initial threshold value. On the other hand, when determining that the individual threshold value is the initial threshold value, individual permission criterion setter 433 keeps the individual threshold value without changes.

Figure 8:
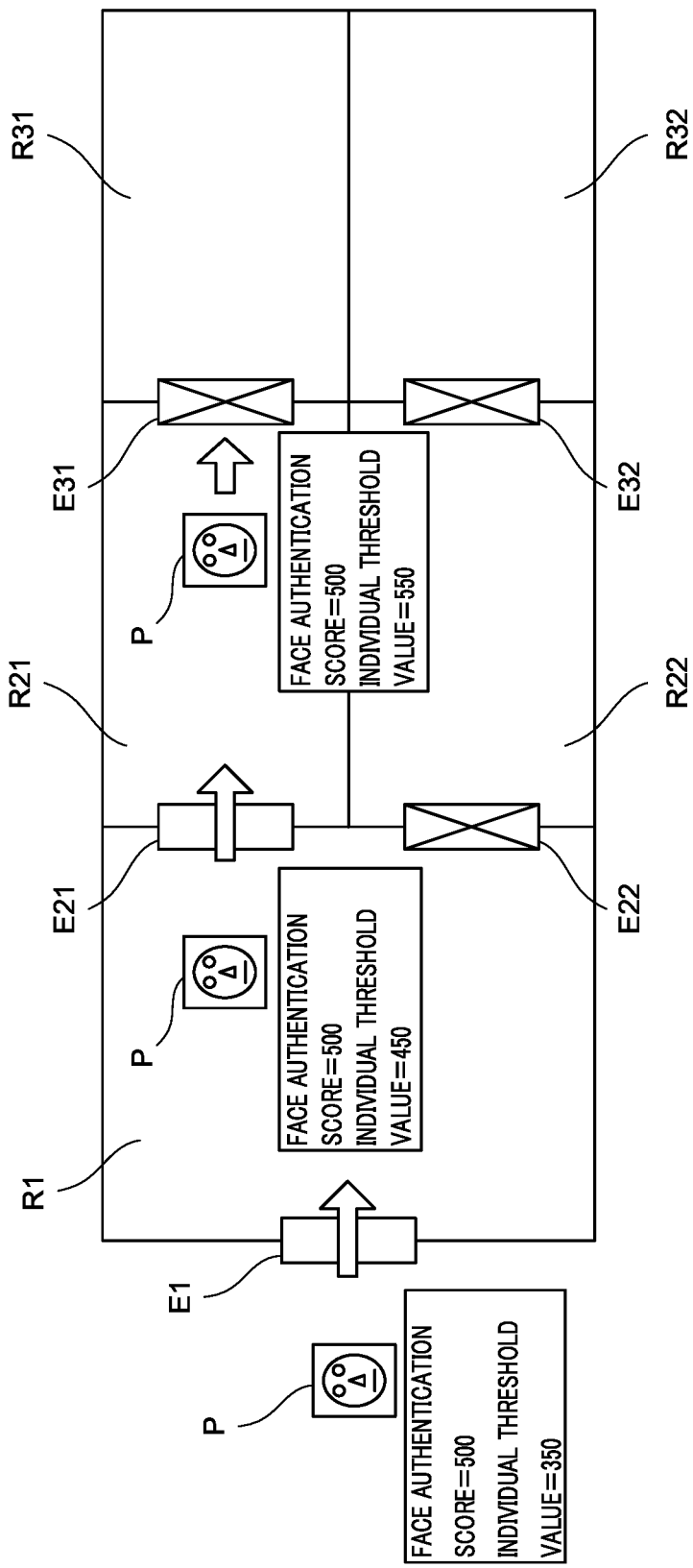
FIG. 8 illustrates an entry management state according to Embodiment 2.

With the above processes, for example, as illustrated in FIG. 8, in a case where a person is actually photograph P of the pass-permitted person, he/she is determined to be impersonating at first entrance/exit E1, but a holder of photograph P is able to pass through first entrance/exit E1 because the face authentication score at first entrance/exit E1 is 500 and the individual threshold value for first entrance/exit E1 is 350 that is the initial threshold value. Further, although he/she is determined to be impersonating at second entrance/exit E21 and the individual threshold value for second entrance/exit E21 is raised to 450, the holder of photograph P is also able to pass through second entrance/exit E21 because the face authentication score at second entrance/exit E21 is about 500. However, the individual threshold value for third entrance/exit E31 is raised to 550 while the face authentication score at third entrance/exit E31 is about 500; accordingly, the holder of photograph P is unable to pass through third entrance/exit E31.

Meanwhile, in a case where a person is a pass-permitted person, he/she is determined to be impersonating due to the influence of outside light at first entrance/exit E1; however, since the face authentication score at first entrance/exit E1 is 500 while the individual threshold value for first entrance/exit E1 is 350 that is the initial threshold value, the pass-permitted person is able to pass through first entrance/exit E1. In addition, under the strong influence of outside light, even in the vicinity of second entrance/exit E21, he/she is determined to be impersonating at second entrance/exit E21, and the individual threshold value is raised to 450 at second entrance/exit E21; however, the pass-permitted person is able to pass second entrance/exit E21 because the face certification score at second entrance/exit E21 is about 500. In addition, although the individual threshold value for third entrance/exit E31 is raised to 550, the face authentication score at third entrance/exit E31 becomes about 800 as a result of the pass-permitted person reaching a place less susceptible to the outside light. Consequently, the pass-permitted person is able to pass through third entrance/exit E31.

As described above, the same effect as in Embodiment 1 is obtainable in Embodiment 2.

Variations of Embodiments

Specific embodiments of the present disclosure above-described in detail are merely examples, and specific embodiments described above may be variously modified and changed.

For example, in Embodiments 1 and 2, the impersonation determination may be performed by using other techniques involving such as a change in a complexion due to a pulse, the presence or absence of a photographic frame in a face image, the presence or absence of a difference in distance between a face region and the other region using a depth sensor.

In Embodiment 1, face authenticator 431 may be provided in first entry management apparatus 2 or second entry management apparatus 3, and in Embodiment 2, face authenticator 431 may be provided in first entry management apparatus 2, second entry management apparatus 3A, or third entry management apparatus 5. In Embodiment 1, first impersonation determiner 23 may be provided in server apparatus 4, and in Embodiment 2, first and second impersonation determiners 23 and 34 may be provided in server apparatus 4.

As first, second, and third passage restrictors 24, 33, and 53, a device may be applied that emits a sound or display indicating restriction of the passage in addition to or in place of the device that physically restricts passage. In this case, a security guard may be notified of the restriction.

In Embodiment 1, a configuration has been described in which an individual threshold value is increased as a configuration in which an individual permission criterion for the pass-permitted person in the face authentication at second entrances/exits E21 and E22 is set to be larger when it is determined that the impersonation is performed than that when it is determined that the impersonation is not performed. However, the individual permission criterion may be set to be higher by eliminating correction of the second face image. Examples of the correction of the second face image include an adjustment of light and/or a direction of the face. The similar techniques may be applied to the individual permission criterion in the face authentication at third entrances/exits E31 and E32 in Embodiment 2.

In Embodiment 2, the individual threshold value may be gradually lowered depending on the number of times the passage through the entrance/exit where the individual threshold value is increased has been performed. For example, in Embodiment 2, in a case where the individual threshold values for both sets of second entrances/exits E21 and E22 and third entrances/exits E31 and E32 are increased, the individual threshold value has been returned to the initial threshold value when the passage through third entrances/exits E31 and E32 is permitted; however, the individual threshold value may be lowered at the time of passage through second entrances/exits E21 and E22 where the individual threshold values are increased, and may be further lowered at the time of passage through third entrances/exits E31 and E32 where the individual threshold values are increased.

In Embodiment 2, when it is determined that the impersonation is performed at both first entrance/exit E1 and second entrances/exits E21 and E22, the restriction of the passage through second entrances/exits E21 and E22 may be maintained to prompt a person in front of third entrances/exits E31 and E32 for the cooperate action.

At the time of exiting from first, second, and third rooms R1, R21, R22, R31, and R32, exit management processing similar to the above-mentioned entry management processing may be performed, or only the exit management processing may be performed without performing the entry management processing. The entrance/exit has been described as an example of the first, second, and third passing points, but the entrance/exit may be an entrance for entry only or may be an exit for exit only. The management target of the entrance and/or exit may be an indoor space such as a room or a floor, as well as an outdoor space such as a baseball stadium, a soccer field, or an amusement park. In Embodiment 2, the passage management has been performed in three stages of the first, second, and third rooms R1, R21, R22, R31, and R32, but the present disclosure may be applied to the management of four or more stages.

In Embodiment 1, the face authentication for restricting the passage through first entrance/exit E1 may not be performed, and in Embodiment 2, the face authentication for restricting the passage through second entrances/exits E21 and E22 may not be performed.

Permitted-person information 421 may be provided with an individual threshold value for the first face image, an individual threshold value for the second image, and an individual threshold value for the third image separately.

In Embodiment 2, the individual permission criterion at the second entrance/exit is set for the face authentication score, but the individual permission criterion may be set for the result of the impersonation determination. This can improve the security level at the second entrance/exit. Incidentally, any embodiment may be provided with the individual permission criterion other than the face authentication score. In Embodiments 1 and 2, when the face authentication score is equal to or larger than the individual threshold value, the individual threshold value may be returned to the initial threshold value stepwise. That is, the threshold value may be gradually made closer to the initial threshold value each time the face authentication score is determined to be equal to or larger than the individual threshold value and thus the passage through the entrance/exit is made. In the manner described above, even when the face authentication score accidentally becomes larger than the individual threshold value despite the impersonation is performed, a warning state can be maintained with a certain degree. Thus, the security level can be maintained even when such an accident occurs. In Embodiments 1 and 2, the amount by which the individual threshold value is increased may be lowered as the face authentication score becomes larger, and the amount by which the individual threshold value is increased may be increased as the face authentication score becomes smaller. This is because that, as described above, there is usually a correlation between the magnitude of face authentication score and the presence or absence of impersonation, and thus the smaller the face authentication score is, the stronger the suspicion of impersonation is. In Embodiments 1 and 2, a state that is unlikely to be permitted has been referred to as a "threshold value is high," whereas a state that is likely to be permitted has been expressed as "threshold value is low." That is, the positive or negative and the size of the threshold value is not an unchangeable value. For example, even a case where the threshold value is implemented positive/negative reversely is also included in the concepts of "threshold value is high" and "threshold value is low" described herein as long as the concept of being unlikely/likely to be permitted is common to the present specification. In Embodiments 1 and 2, the impersonation determination has been performed before passing through each entrance/exit, but it may be performed after passing through each entrance/exit. This is because the result similar to that of Embodiments 1 and 2 can be obtained by performing the impersonation determination before a person who has been permitted to pass through reaches the next entrance/exit and by increasing the individual threshold value when impersonation is suspected. In this case, as compared with Embodiments 1 and 2, the apparatus for performing the impersonation determination can be placed at a different position from the entrance/exit, and thus the degree of freedom in arrangement of the apparatus is enhanced. In Embodiments 1 and 2, the pass-permitted person subject to an increase in the individual permission criterion when it is determined that the impersonation is performed has been identified based on the face image. According to this configuration, a camera or the like can be used as both a configuration for identifying a pass-permitted person and a configuration for determining impersonation, and thus, it is possible to reduce the size of overall apparatus. Alternatively, the pass-permitted person may be identified, without using the face image, by reading information identifying the pass-permitted person from an IC card or the like owned by a person attempting to pass through. In the manner described above, the pass-permitted person can be more precisely identified.

Although the embodiments according to the present disclosure have been described in detail with reference to the drawings, the functions of entry management systems 1 and 1A described above can be implemented by a computer program.

Figure 9:
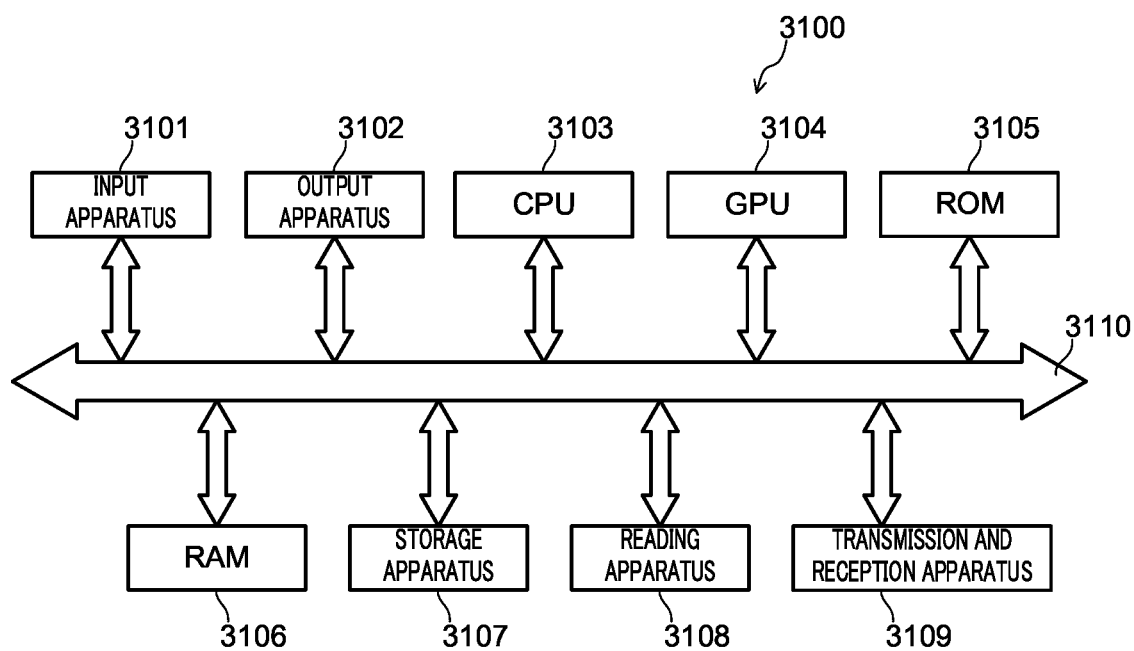
FIG. 9 illustrates an exemplary hardware configuration according to the embodiments of the present disclosure.

FIG. 9 illustrates an exemplary hardware configuration of a computer that implements the functions of each of the apparatuses by the program. Computer 3100 includes input apparatus 3101 such as a keyboard, mouse, or touchpad, output apparatus 3102 such as a display or speaker, Central Processing Unit (CPU) 3103, Graphics Processing Unit (GPU) 3104, Read Only Memory (ROM) 3105, Random Access Memory (RAM) 3106, storage apparatus 3107 such as a hard disk device or Solid State Drive (SSD), reading apparatus 3108 for reading information from a recording medium, for example, Digital Versatile Disk Read Only Memory (DVD-ROM) or Universal Serial Bus (USB) memory, and transmission and reception apparatus 3109 that performs a communication via a network. These apparatuses are connected with each other via bus 3110.

Reading apparatus 3108 reads a program from the recording medium recording the program for realizing the functions of each of the apparatuses described above and stores the read program in storage apparatus 3107. Alternatively, transmission and reception apparatus 3109 communicates with a server apparatus connected to the network and stores, in storage apparatus 3107, a program for implementing the functions of each of the apparatuses downloaded from the server apparatus.

CPU 3103 then copies the program stored in storage apparatus 3107 to RAM 3106, sequentially reads an instruction included in the program from RAM 3106, and executes the read instruction, and thereby the functions of each of the apparatuses are implemented.

Each functional block used in the descriptions of the above embodiments can be typically realized by a Large Scale Integration (LSI), which is an integrated circuit. The LSI may be individually formed as chips, or one chip may be formed so as to include a part or all functional blocks. Although it is called the LSI here, it may be referred to as an IC, a system LSI, a super LSI, or an ultra LSI depending on a difference in the degree of integration.

However, the technique of implementing an integrated circuit is not limited to the LSI and may be realized by using a dedicated circuit, a general-purpose processor, or a special-purpose processor. In addition, a Field Programmable Gate Array (FPGA) that can be programmed after the manufacture of the LSI or a reconfigurable processor in which the connections and the settings of circuit cells disposed inside the LSI can be reconfigured may be used.

If future integrated circuit technology replaces LSIs as a result of the advancement of semiconductor technology or other derivative technology, the functional blocks could be integrated using the future integrated circuit technology. Biotechnology can also be applied. Meanwhile, in recent years, in Internet of Things (IoT) art, Cyber Physical Systems (CPS), which is a new concept of creating new added-value by information cooperation between a physical space and a cyber space, has been attracting attention. This CPS concept can also be employed in the above embodiments. That is, as a basic configuration of the CPS, for example, an edge server provided in the physical space and a cloud server provided in the cyber space are connected via a network, and thus it is possible to perform distributed processing by a processor mounted on both servers. Here, each kind of processing data generated in the edge server or the cloud server is preferably generated on a standardized platform, and using such standardized platform makes it possible to improve the efficiency in constructing a system including various sensor groups and IoT application software. In the above-described embodiments, for example, the edge server is placed at the entrance/exit, acquires the face image of a person imaged by the camera, performs a process of extracting the feature point and the like of the face image, and generates predetermined processing data. The cloud server performs the face authentication process using the processing data received from the edge server via the network, takes over the processing data related to the authentication process by the face authentication application software, and outputs an authentication result. Further, in the above-described embodiments, the impersonation determination may be performed by the edge server, and the face authentication process may be performed by the cloud server. This is because the impersonation determination can be performed without correct-answer data for individual face images, and the load thereof is smaller than that of the face authentication process, so there is no need to be collectively processed by the cloud server.

The disclosure of Japanese Patent Application No. 2019-123753, filed on Jul. 2, 2019, including the specification, drawings and abstract, is incorporated herein by reference in its entirety.

INDUSTRIAL APPLICABILITY

An aspect of the present disclosure is useful for passage permission determination apparatuses, passage management systems, passage permission determination methods, and computer programs.

REFERENCE SIGNS LIST 1,1A Entry management system (passage management system)
2 First entry management apparatus
3,3A Second entry management apparatus
4 Server apparatus
5 Third entry management apparatus
21 First communicator
22 First imager
23 First impersonation determiner
24 First passage restrictor
31 Second communicator
32,32A Second imager
33 Second passage restrictor
34 Second impersonation determiner
41 Server communicator
42 Memory
43 Server controller
51 Third communicator
52 Third imager
53 Third passage restrictor
100,100A Passage permission determination apparatus
421 Permitted-person information
422 Permitted-person face information
423 Individual permission criterion information
431 Face authenticator
432 Passage permission determiner
433 Individual permission criterion setter
3100 Computer
3101 Input apparatus
3102 Output apparatus
3103 CPU
3104 GPU
3105 ROM
3106 RAM
3107 Storage apparatus
3108 Reading apparatus
3109 Transmission and reception apparatus
3110 Bus
E1 First entrance/exit (first passing point)
E21,E22 Second entrance/exit (second passing point)
E31,E32 Third entrance/exit (third passing point)
P Photograph
R1 First room
R21,R22 Second room
R31,R32 Third room

The invention claimed is:

1. A passage permission determination apparatus, comprising:
a passage permission determining circuit that permits passage through a first passing point by a person in a case where a first face image of the person at the first passing point satisfies an individual permission criterion that is a criterion with which face authentication determines that the person is a pass-permitted person; and
an individual permission criterion setting circuit that modifies the individual permission criterion for the pass-permitted person that has passed the first passing point at a second passing point to be higher than the individual permission criterion that has been set at the first passing point, in a case where the person who has been permitted for the passage through the first passing point is determined to be impersonating the pass-permitted person,
for the pass-permitted person at the second passing point,
wherein
the passage permission determining circuit restricts passage through the second passing point by the person in a case where a second face image of the person at the second passing point does not satisfy the individual permission criterion that has been set higher, and
the passage through the second passing point is restricted by physically locking or blocking an entrance at the second passing point.

2. The passage permission determination apparatus according to claim 1, wherein
the individual permission criterion setting circuit identifies the pass-permitted person for whom the individual permission criterion is set to be higher, based on the first face image.

3. The passage permission determination apparatus according to claim 1, wherein
the individual permission criterion setting circuit does not change the individual permission criterion for the pass-permitted person from the individual permission criterion at the first passing point, in a case where the person at the first passing point is determined to be not impersonating the pass-permitted person.

4. The passage permission determination apparatus according to claim 1, wherein
the individual permission criterion setting circuit lowers the individual permission criterion in a case where the second face image satisfies the individual permission criterion that has been set higher.

5. The passage permission determination apparatus according to claim 4, wherein
the individual permission criterion setting circuit returns the individual permission criterion to the individual permission criterion at the first passing point in a case where the second face image satisfies the individual permission criterion that has been set higher.

6. The passage permission determination apparatus according to claim 1, wherein
whether the person who has been permitted for the passage through the first passing point is impersonating the pass-permitted person is determined before the person passes through the first passing point.

7. The passage permission determination apparatus according to claim 1, wherein
- the passage permission determining circuit permits the passage through the second passing point by the person in a case where the second face image of the person at the second passing point satisfies the individual permission criterion that has been set higher,
- the individual permission criterion setting circuit sets an individual permission criterion of the face authentication for the pass-permitted person at a third passing point after the second passing point to be even higher, in a case where the person who has been permitted for the passage through the second passing point is determined to be impersonating the pass-permitted person, and
- the passage permission determining circuit restricts passage through the third passing point by the person in a case where a third face image of the person at the third passing point does not satisfy the individual permission criterion that has been set even higher.

8. A passage management system, comprising:
- the passage permission determination apparatus according to claim 1;
- an impersonation determining circuit that performs determination whether the person at the first passing point is impersonating the pass-permitted person;
- a memory that stores permitted-person face information regarding a face of the pass-permitted person, the permitted-person face information being used for the face authentication;
- a first imaging circuit that generates the first face image at the first passing point;
- a face authenticating circuit that determines whether the second face image of the person at the second passing point after the first passing point satisfies the individual permission criterion; and
- a second passage restricting circuit that does not restrict the passage through the second passing point in a case where the passage through the second passing point is permitted by the passage permission determining circuit, and restricts the passage through the second passing point in a case where the passage through the second passing point is not permitted by the passage permission determining circuit.

9. The passage management system according to claim 8, wherein
- the impersonation determining circuit is placed at an entrance/exit provided at the first passing point.

10. The passage management system according to claim 8, further comprising a server apparatus placed at a position other than the passing points, the server apparatus being provided with the face authenticating circuit.

11. A passage permission determination method, comprising:
- permitting passage through a first passing point by a person in a case where a first face image of the person at the first passing point satisfies an individual permission criterion that is a criterion with which face authentication determines that the person is a pass-permitted person;
- modifying the individual permission criterion of the face authentication for the pass-permitted person that has passed the first passing point at a second passing point to be higher than the individual permission criterion that has been set at the first passing point, in a case where the person who has been permitted for the passage through the first passing point is determined to be impersonating the pass-permitted person; and
- restricting passage through the second passing point by the person in a case where a second face image of the person at the second passing point does not satisfy the individual permission criterion that has been set higher,
- wherein the passage through the second passing point is restricted by physically locking or blocking an entrance at the second passing point.

12. A non-transitory computer-readable medium storing a computer program that causes a computer to perform processing comprising:
- permitting passage through a first passing point by a person in a case where a first face image of the person at the first passing point satisfies an individual permission criterion that is a criterion with which face authentication determines that the person is a pass-permitted person;
- modifying the individual permission criterion of the face authentication for the pass-permitted person that has passed the first passing point at a second passing point to be higher than the individual permission criterion that has been set at the first passing point, in a case where the person who has been permitted for the passage through the first passing point is determined to be impersonating the pass-permitted person; and
- restricting passage through the second passing point by the person in a case where a second face image of the person at the second passing point after the first passing point does not satisfy the individual permission criterion that has been set higher,
- wherein the passage through the second passing point is restricted by physically locking or blocking an entrance at the second passing point.

13. The passage management system according to claim 9, further comprising a server apparatus placed at a position other than the passing points, the server apparatus being provided with the face authenticating circuit.

* * * * *